3,337,516
DETERGENT COPOLYMER OF POLYGLYCOL ALKENYL ETHERS

Frank A. Stuart, Orinda, William T. Stewart, El Cerrito, and Warren Lowe and Frank W. Kavanagh, Berkeley, Calif., assignors to Chevron Research Company, a corporation of Delaware
No Drawing. Application May 28, 1962, Ser. No. 197,839, now Patent No. 3,189,586, dated June 15, 1965, which is a division of application Ser. No. 821,686, June 22, 1959, which in turn is a division of application Ser. No. 729,560, Apr. 21, 1958. Divided and this application Jan. 21, 1965, Ser. No. 427,159
3 Claims. (Cl. 260—86.1)

This application is a division of Stuart, Stewart, Lowe and Kavanagh patent application Ser. No. 197, 839, filed May 28, 1962; which in turn is a division of Stuart, Stewart, Lowe and Kavanagh patent application Ser. No. 821,686, filed June 22, 1959; which in turn is a division of Stuart, Stewart, Lowe and Kavanagh patent application Ser. No. 729,560, filed Apr. 21, 1958; which is a continuation-in-part of Stuart, Stewart, Lowe and Kavanagh patent application Ser. No. 574,635, filed Mar. 29, 1956; which in turn is a continuation-in-part of Stuart, Stewart, Lowe and Kavanagh patent application Ser. No. 400,757, filed Dec. 28, 1963; Lowe, Stewart, Stuart and Kavanagh patent application Ser. No. 400,758, filed Dec. 28, 1953; and Stewart, Stuart, Lowe and Kavanagh patent application Ser. No. 400,759, filed Dec. 28, 1953; which are continuations-in-part of Stuart, Stewart, Lowe and Kavanagh patent applications Ser. No. 340,378, filed Mar. 4, 1953.

This application is also a continuation-in-part of Lowe, Stuart, Stewart and Kavanagh patent application Ser. No. 645,887, filed Mar. 14, 1957; and Stewart, Lowe, Stuart and Kavanagh patent application Ser. No. 645,888, filed Mar. 14, 1957; and Lowe, Stuart, Stewart and Kavanagh patent application Ser. No. 646,524, filed Mar. 18. 1957.

All of the above-mentioned patent applications, with the exception of applications Ser. No. 197,839, Ser. No. 821,686 (now U.S. Patent No. 3,073,807) and Ser. No. 729,560 (now U.S. Patent No. 2,892,783), are now abandoned.

This invention relates to a novel lubricant composition, and it is particularly directed to the provision of a lubricant composition which is adapted to be employed in internal combustion engines.

With the refinements now being made in automotive and other internal combustion engines, a great deal of attention is being directed to the provision of a lubricant which will permit the engine to be operated at a high level of efficiency over long periods of time. The primary function of the lubricant is, of course, to reduce friction and thereby not only decrease the wear on pistons, piston walls, bearings and other moving parts, but also increase the efficiency of the engine. Additionally, it is also a function of the lubricant to prevent the deposition of solid products on the piston walls atnd other surfaces of the engine coming in contact with the lubricant. Such deposits seriously interfere with efficient engine operation for they accelerate piston ring and cylinder wall wear and also increase oil losses by plugging the oil ring grooves. The troublesome deposits which form on the face of the piston and on the other walls of the combustion chamber, as well as on valves and spark plugs are also partially attributable in many cases to the lubricant, and especially to various of the metal-containing additives employed therein. It is of importance to eliminate or at least minimize the formation of all such deposits, and it is the basic object of this invention to achieve such a result.

To a minor degree, certain of the deposits formed on engine surfaces have their origin in the oil itself, that is to say, in the decomposition products of the oil. A more important, though still minor, source of engine deposits lies in the additives with which oils are conventionally supplied. This is particularly the case with metal-containing additives as, for example, the organic, metal-containing salts which are incorporated in the oil to increase the detergency thereof, and the various metal-containing compounds which are added to increase the lubricity of the oil and reduce piston ring and cylinder wall wear. Whenever oil is burned in the engine (as occurs with the oil film present in the cylinder wall during the combustion stroke) any metal-containing additives present in the oil may form an ash which is partially deposited out on the various surfaces of the combustion chamber and on those of the spark plugs and valves. Accordingly, it is a particular object of this invention to provide a lubricant composition which is compounded with metal- or mineral-free detergents and wear-reducing additives.

While certain of the additives heretofore employed in oils (and to a lesser degree the oil itself) are partially responsible for deposits which form on engine surfaces, it is now recognized that the major source of such deposits or their precursors lies in the various aldehydes, acids, oxy-acids and other similarly reactive, partially-oxidized combustion products of the fuel. These products are formed both under pre-ignition conditions as well as during the combustion step proper, particularly during the period before the engine has reached operating temperature. Accordingly, under city driving conditions where the engine is repeatedly started in the cold condition and is seldom driven for a distance sufficient to reach the most efficient operating temperatures, the formation of partial oxidation products is particularly severe. Many of these partial oxidation products are carried down into the crankcase of the engine along with other blow-by gases, and since most are insoluble or only sparingly soluble in lubricating oils, they tend to separate from the oil and adhere to engine surfaces or form large droplets. In either case, under the elevated temperature conditions prevailing in the engine, these reactive monomers quickly polymerize to form solid masses which readily deposit out on the engine wall surfaces.

It is the practice in the art to prevent the formation of such deposits by adding to the lubricant a material normally referred to as a detergent. Insofar as is known, all the detergent additives which have been successfully employed prior to the present invention on a commercial scale are organic, metal-containing compounds such as calcium petroleum sulfonate, calcium cetyl phosphate, calcium octyl salicylate, calcium phenyl stearate, the barium salt of wax-substituted benzene sulfonate, or the potassium salt of the reaction product of phosphorus pentasulfide and polybutene. Various of these detergents act by reacting chemically with deposit precursors to form harmless compounds. Others act to prevent flocculation or coagulation of solid particles in the oil and maintain the same in a state of suspension as finely divided particles. Still others not only perform this dispersant function but also effect the solubilization or emulsification of the sparingly soluble monomers in the oil and thereby greatly reduce the rate of polymerization. In the latter case, such polymer materials as do then form within the body of the oil are smaller in size and can be peptized or dispersed in the oil much more readily than is the case with the large polymeric particles which are formed on exposed engine surfaces or in droplets lying without the oil.

Detergents capable of acting in the latter fashion are preferably employed wherever possible, particularly in automotive engines to be operated under city driving conditions. However, even among the metal-containing additives, few are available which are capable of solubilizing any appreciable amount of all the many types of polymer precursors which are carried into the oil from the fuel. Accordingly, it is a more particular object of this invention to provide a lubricant composition incorporating a metal-free detergent which is capable of solubilizing or emulsifying in the lubricant large amounts of all the various partial oxidation products of the fuel which are carried into the oil, and which is also capable of maintaining in suspension in the oil the various solid polymeric materials which are present therein.

The problem of piston ring and cylinder wall wear, especially the control thereof, is also one which is closely related to the composition of the crankcase lubricant. Aside from abrasive wear, which is caused by dust and dirt and can be remedied by suitable filtering and air-cleaning means, a large part of the wear experienced by piston rings and cylinder wall is attributable to chemical attack by moisture and acidic products originating as by-products of fuel combustion. In engines operated at optimum temperature levels, these combustion products are largely discharged through the exhaust and breather pipe. However, under the relatively "cold" conditions experienced in city driving, and especially at cylinder wall temperatures below about 150° F., the moisture and acid products are condensed on the engine surfaces where they promote corrosive attack and are in a position to work past the piston and accumulate within the engine and in the crankcase oil. This difficulty is one which the art has heretofore met most successfully by supplying the lubricating oil with additives such as the various metal salts of petroleum sulfonic acids and other metal-organic compounds, especially those having a basic reaction. However, this practice has a disadvantage of adding still another metal-containing ingredient to the oil and therefore of increasing the deposit-forming characteristics of the lubricant composition. Accordingly it forms still another object of this invention to provide a lubricant composition containing a metal- or mineral-free additive which effectively decreases the wear experienced by piston rings and cylinder walls, particularly during periods before the engine has become thoroughly warmed to operating temperatures.

In previously filed copending patent applications of the present inventors, as hereinafter noted, the invention is based on the discovery that certain polyglycol substituted copolymers, which contain no metal component and therefore are substantially free of any ash-forming tendency, have the ability to impact excellent detergent and antiwear qualities to lubricating oils employed in internal combustion engines. In particular, these copolymers have the ability to solubilize in the oil large amounts of all the various partially oxidized combustion products of the fuels employed in internal combustion engines, while also having the ability of maintaining in a state of suspension any solid polymeric products present in the oil. Additionally, the copolymeric additives effectively reduce the wear experienced by piston rings and cylinder wall surfaces even under the most unfavorable operating conditions such as are experienced during the starting and warming up of the engine. These additives have the advantage that they apparently do not combine chemically with the various polymer precursors which are solubilized or dispersed in the oil, nor apparently do they act by a neutralization reaction in counteracting the effect of the various acidic fuel combustion by-products. Accordingly, they are capable of giving excellent protection against engine deposits and wear over extended operating periods. Furthermore, the copolymeric additives of the polyglycol ester type are noncorrosive to the various bearing metals employed in engines.

Since the additives containing polyglycol groups differ in kind from any previously proposed for either detergent or antiwear purposes, it would have been surprising to discover that they were effective for any of the above purposes. The fact that they possessed not one but all of said qualities was altogether unexpected and could not have been predicted.

The polyglycol additive of the present invention is a predominantly aliphatic hydrocarbon macromolecule having polyglycol groups which comprises up to about 99.9% by weight of hydrocarbon oil-solubilizing groups selected from the class consisting of aliphatic and cycloaliphatic hydrocarbon groups of at least 4 carbon atoms each and at least about 0.1% by weight of polyglycol groups having at least 5 alkylene oxide units in each polyglycol group and from 2 to 7 carbon atoms in each alkylene oxide unit, said macromolecule having an average molecular weight of at least about 50,000 and a solubility in oil of at least 0.5% by weight.

The essential composition of the polyglycol additive as described above is the predominantly aliphatic hydrocarbon macromolecule having polyglycol groups. The aliphatic hydrocarbon portion provides the oil solubility to the additive and the polyglycol portion provides the polarity to the additive. The combination of these portions in the macromolecule results in an additive having the detergent and antiwear properties as noted above. However, other groups characteristic of macromolecule lubricating oil additives, including other polar groups besides the polyglycol groups, may be incorporated without substantially altering the detergent or antiwear properties.

The term macromolecule as employed in this description is used in its commonly accepted sense and refers to large molecules such as those occurring in nature, for example, the polysaccharides and the polypeptides illustrated by cellulose and the protein polypeptides, or those synthesized by polymerization and condensation reactions.

Polyglycol additives within the foregoing description are illustrated by the general formula

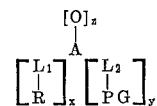

in which A is an organic macromolecule group, preferably an aliphatic hydrocarbon group, and R is an aliphatic or cycloaliphatic hydrocarbon group of at least 4 carbon atoms or mixtures thereof, $L_1$ and $L_2$ are suitable divalent linking groups, PG is a polyglycol group having at least 5 alkylene oxide units and from 2 to 7 carbon atoms in each alkylene oxide unit and O is a polar group other than the polyglycol group. The letters $x$, $y$ and $z$ in the formula are integers showing the number of times the bracketed portions occur.

Illustrative polyvalent linking groups of the type mentioned in the preceding paragraph include alkylene groups such as methylene —$CH_2$—, oxy —O—, carbonyl

carbonyloxy

sulfonyloxy

iminocarbonyl

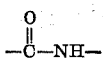

ureylene

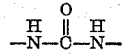

imino carbonyloxy

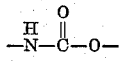

sulfide —S—, phosphonyloxy

and
imino —NH— groups and combinations thereof with alkylene groups of from 1 to 7 carbon atoms each.

Illustrative polar groups other than the polyglycol group include the free carboxyl group

the amidocarbonyl group

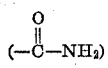

hydroxy and amino-substituted alkylamide groups,

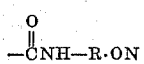

and

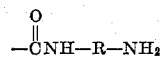

where R is an alkylene group, preferably of not more than 7 carbon atoms, hydroxy and amino-substituted alkyl ester groups, heterocyclic nitrogenous groups, such as pyridyl, pyrollidyl and carbazolyl groups, epoxy groups, such as the glycidyl group, and cyano groups.

The predominantly aliphatic hydrocarbon macromolecule of the invention due to its high molecular weight of at least 50,000 is most suitably a polymeric type compound. For example, satisfactory polyglycol additives are obtained by attaching polyglycol groups to ethylene, propylene or isobutylene polymers by means of suitable linking groups. Particularly suitable hydrocarbon macromolecules are obtained by copolymerizing (A) oil solubilizing olefins of 2 to 30 carbon atoms or monomeric compounds having a polymerizable ethylenic group and containing a hydrocarbyl group of from 4 to 30 aliphatic carbon atoms, (B) polyglycol monomeric compounds having a polymerizable ethylenic linkage and a polyglycol group containing at least 5 alkylene oxide units in which each alkylene oxide unit has from 2 to 7 carbon atoms and, optionally, (C) monomeric polar compounds having a polymerizable ethylenic linkage and a polar group of the type mentioned above.

The oil-solubilizing monomer portion of the polymeric additives of this invention can be any compound having at least one ethylenic linkage (>C=C<), together with at least one substituent group which contains an oil-solubilizing hydrocarbyl group of from 4 to 30 aliphatic carbon atoms, and which is characterized by the ability to copolymerize through said ethylenic linkage with the polar monomer referred to above in the presence of a suitable catalyst. Alternatively, the oil-solubilizing aliphatic radical can be introduced into the copolymer, as will hereinafter be more fully described. This aliphatic radical, whether present in the original monomer or introduced into the copolymer, imparts oil solubility to the polymer and is preferably a branched- or straight-chain alkyl radical or a cycloalkyl radical such as butyl, isobutyl, n-pentyl, n-hexyl, 2-ethylhexyl, decyl, dodecyl, tetradecyl, cyclohexyl, 4-ethylcyclohexyl, or the like, or an alkenyl radical such as oleyl, ricinoleyl, or the like, wherein the ethylenic double bond has substantially no copolymerizing tendency. Oil solubilizing monomers of this general character are well known in the art and are frequently employed as the oil-solubilizing portion of copolymers which are added to lubricating oils to improve the viscosity index and pour point characteristics thereof. They include such materials as olefins and ethylenically unsaturated ethers, esters, ketones, aldehydes, and the like.

The oil-solubilizing monomeric compounds of component (A) may also be illustrated by the following general formula:

$$R_1(G')_{n'}CH=CH(G)_nR_2$$

in which $R_1$ and $R_2$ are members of the group consisting of hydrogen and hydrocarbon radicals of from 4 to 30 carbon atoms, at least one of which contains an aliphatic hydrocarbon group of from 4 to 30 carbon atoms as described above, G and G' are members of the class consisting of oxy (—O—), carbonyl

and carbonyloxy

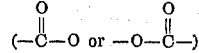

groups and combinations thereof with not more than two alkylene groups of from 1 to 7 carbon atoms each, and $n$ and $n'$ are 0 or 1. When $R_1$ and $R_2$ are hydrocarbon radicals, they may be alkyl, cycloalkyl, alkenyl, cycloalkenyl, aryl, alkaryl or aralkyl in structure, as illustrated by radicals such as 2-ethylhexyl, cyclohexyl, hexenyl, cyclohexenyl, phenyl, naphthyl, tertiary butylphenyl benzyl, etc., with the preferred radicals being as previously mentioned.

Representative oil-solubilizing olefins and monomeric compounds of the aforementioned types which can be employed to form the copolymeric additives of the present invention include the following.

Olefins:
    Ethylene
    Propylene
    Butene-1
    Isobutene
    Pentene-1
    Hexene-1
    2-ethylhexene-1
    Di and triisobutylene
    Tripropylene
    Dodecene-1
    Hexadecene-1
    Cyclohexene
    Octadecene-1
    4-octylcyclohexene-1
    3-phenylhexadecene-1
    p-Octylstyrene Vinylcyclohexane
2-hexadecylbutadiene-1,3
p-Tertiarybutylstyrene Ethers:
  Vinyl-n-butyl ether
  Vinyl 2-ethylhexyl ether
  Allyl n-butyl ether
  Allyl isobutyl ether
  Allyl cyclohexyl ether
  Allyl 4,4,8,8-tetramethyldocosyl ether
  Methallyl n-hexyl ether
  Methallyl n-decyl ether
  Methallyl 2-ethylhexyl ether
  Methallyl octadecyl ether
  Propenyl 2-ethylhexyl ether
  Crotyl n-octyl ether
  Isopropenyl dodecyl ether
  1-decenyl butyl ether
  1-eicosenyl decyl ether
  Vinyl p-octylphenyl ether
  Methallyl p-tert.butylphenyl ether
  1-decenyl p-cetylphenyl ether
  1-decenyl 2-phenylbutyl ether Esters:
  Vinyl caproate
  Vinyl palmitate
  Vinyl oleate
  Allyl caprylate
  Allyl laurate
  Allyl oleate
  Allyl palmitate
  Allyl stearate
  Allyl 2-ethylhexanoate
  Allyl ricinoleate
  Allyl esters of babassu acids
  Allyl esters of lard acids
  Allyl naphthenate
  Methallyl caproate
  Methallyl naphthenate
  Methallyl ricinoleate
  Methallyl p-octylbenzoate
  Methallyl oleate
  Cyclohexyl 2-dodecenoate
  Decyl vinylacetate
  Isooctyl α-chloroacrylate
  p-Isoamylphenyl 2-hexadecenoate
  4-p-tolylbutyl 2-octadecenoate
  Undecyl cinnamate
  Methylcyclohexyl 2-ethyl-2-hexenoate
  5-ethyldocosyl crotonate
  Octadecyl isocrotonate
  n-Butyl-2-eicosenoate
  p-Tert.amylphenyl octadecyl maleate
  p-Hexadecylphenyl 2-ethylhexyl maleate
  o-Tolyl 2-octadecylcyclohexyl maleate
  Methallyl cyclohexane carboxylate
  Methallyl palmitate
  Crotyl oleate
  Crotyl naphthenate
  α-Methylcrotyl palmitate
  1-propenyl naphthenate
  1-propenyl elaidate
  Dodecyl acrylate
  Hexadecyl methacrylate
  Isobutyl α-decylacrylate
  Vinyl p-n-octyl benzoate
  Allyl 3,5-diisobutyl benzoate
  Cyclohexyl methacrylate
  o-Nonylphenyl-hexadecyl maleate
  Dihexadecyl maleate
  Dimethylcyclohexyl maleate
  Mono-2-ethylhexyl maleate
  Di-2-ethylhexyl maleate
  Di-dodecyl maleate
  Di-dodecyl fumarate
  Di-dodecyl mesaconate
  Di-dodecyl citraconate
  o-Tolyl octadecyl itaconate
  Mono-hexadecyl itaconate
  Isopropenyl palmitoleate
  1-decenyl laurate
  1-hexadecenyl myristate Although any of the oil solubilizing compounds described above will give effective copolymer compositions for lubricant compositions in accordance with the present invention, higher alkyl esters of $\alpha,\beta$-unsaturated monocarboxylic acids of from 3 to 6 carbon atoms having alkyl groups of from 8 to 30 carbon atoms are most preferred, both for availability and effectiveness of copolymers prepared from them. Representative acids of this type are the acrylic, methacrylic, crotonic, tiglic, angelic, $\alpha$-ethylacrylic, $\alpha$-methylcrotonic, $\alpha$-ethylcrotonic, $\beta$-ethylcrotonic, $\beta$-propylcrotonic, and hydrosorbic acids and the like. Even more desirable are the alkyl esters of acrylic and methacrylic acids containing from 10 to 20 carbon atoms in the alkyl groups, since they are found to provide highly superior polymers for the lubricant compositions of the invention and are obtainable in commercial quantities.

Various copolymers employing representative oil-solubilizing monomers of the foregoing types were prepared to illustrate the oil solubilizing effect of the monomers on the resultant copolymers. The solubility of the copolymers in oil and their suitability as lubricating oil additives were demonstrated by incorporating the copolymers into lubricating oils. The lubricant compositions thus obtained were tested to determine their detergency and deposition properties. The results of these tests are given in Table I below.

In the tests the base oil, unless otherwise indicated, is a solvent-refined, wax-free, SAE–30 grade mineral lubricating oil having a viscosity index of 85 which is derived from California waxy crude. Various amounts of the copolymers are incorporated into the oil as indicated in terms of percent by weight.

The Piston Varnish Ratings of the lubricant compositions were obtained by the standard FL–2 test procedure as set out in the June 21, 1948, report of the Coordinating Research Council. In this test the lubricants are tested in a 6-cylinder Chevrolet engine, using a low-grade gasoline especially prone to cause engine deposits. At the end of each test the engine was dismantled and the detergency of deposition properties of the lubricant compositions were determined by examining the engine deposits on the piston and visually rating them as to the amount of piston varnish present. The Piston Varnish Ratings of the compositions are given in numerical terms on a scale of 0–10 with "10" representing the complete absence of deposits.

The deposition characteristics of the lubricant compositions containing the copolymeric additives were also determined in the Lacquer Deposition Test. In this test typical engine fuel combustion products were passed into the lubricant compositions and the ability of the lubricant compositions to solubilize and retain the lacquer-forming materials was observed by weighing the amount of lacquer deposits formed on a fresh iron catalytic surface for a standard period of time. The Lacquer Deposit of the lubricant composition is taken as the number of milligrams deposit on the metal surface, and may be correlated directly to the Piston Varnish Rating obtained in the standard FL–2 test procedure outlined in the above paragraph.

Both the FL–2 test procedure and the Lacquer Deposition Test are more fully described in the disclosure which follows with regard to the particular lubricant composition of the present invention.

TABLE I

| Lubricant Composition | Ratio of (1) Monomer to (2) Monomer to (3) Monomer, etc. | Piston Varnish Rating | Lacquer Deposit (milligrams) | Piston Varnish Rating (estimated from lacquer deposit) |
|---|---|---|---|---|
| *3.0% (1) Tridecyl methacrylate, (2) Octadecyl methacrylate, (3) Monododecyl ether of hexadecaethylene glycol ᵃ methacrylate. | 10/6/1 | 8.4 | | |
| 2.8% (1) Vinyl stearate, (2) Maleic anhydride, (3) Monododecyl ether of pentaethylene glycol ᵇ methacrylate, (4) Methacrylamide. | 30/1/2/1 | | 325 | 6.0 |
| 2.8% (1) Hexene-1, (2) Dodecyl methacrylate, (3) Methacrylic acid, (4) Monododecyl ether of eicosaethylene glycol ᶜ methacrylate. | 25/25/1/4 | | 400 | 5.5 |
| 2.8% (1) Di-2-ethylhexyl fumarate, (2) Octadecene-1, (3) Crotonic acid, (4) Monotridecyl ether of decaethylene glycol ᵈ methacrylate. | 25/25/8/2 | | 570 | 4.0 |
| 2.8% (1) Allyl ethyl ether, (2) Vinyl stearate, (3) Itaconic acid, (4) Monododecyl ether of decaethylene glycol ᵈ crotonate. | 14/50/7/3 | | | |
| 1.5% (1) Dodecyl acrylate, (2) Monododecyl ether of decaethylene glycol ᵈ acrylate, (3) Acrylic acid. | 780/9/1 | 5.6 | | |

*In 140 Neutral Mineral Lubricating Oil from solvent-refined waxy California crude.
ᵃ Polyethylene glycol of 704 M.W.
ᵇ Polyethylene glycol of 220 M.W.
ᶜ Polyethylene glycol of 880 M.W.
ᵈ Polyethylene glycol of 440 M.W.

From the above test data it will be seen that all of the various oil-solubilizing monomers representative of the aforementioned types were effective in the production of useful, copolymeric lubricating oil additives which are capable of preventing deposits from lubricant compositions under typical engine operating conditions. These monomers, as previously described, constitute a definite, recognized class of compounds which have been used heretofore in the art in the production of polymeric lubricating oil additives of the nonpolar type, such as VI improvers and pour point depressants. Although the results demonstrate beyond any reasonable doubt the suitability of the different oil-solubilizing monomers within the terms of the description in the production of oil soluble copolymers, it should be understood that the efficacy of each individual class of copolymers as detergents is primarily dependent upon the polyglycol group and its relationship to the rest of the copolymer.

Briefly described, the polyglycol groups of the predominantly aliphatic hydrocarbon macromolecule additives according to the invention are essentially characterized by the presence of at least 5 alkylene oxide units each with alkylene groups of from 2 to 7 carbon atoms each as previously mentioned. The end of the polyglycol group other than that linked to form the macromolecule may be hydroxyl or it may have other terminal groups, including polar groups.

The polyalkylene glycols of the polyglycol monomeric compounds noted previously as the (B) components of the particular polymeric additives of the invention have the above-described essential characteristics. Poly-1,2-alkylene glycols and their alkyl ethers having molecular weights between 220 and 30,000 are preferred. Such glycols may be obtained by polymerizing 1,2-alkylene oxides or mixtures thereof in the presence of a catalyst and a suitable initiator for the reaction such as water, monohydric alcohol in the case of the alkyl ethers, mercaptans and the like. The preparation of polyglycol compounds of this type has been fully described heretofore in U.S. Patents 2,448,664 and 2,457,139, for example, and, therefore, requires no detailed discussion here.

For present purposes, the most suitable poly-1,2-alkylene glycol groups are those derived from ethylene oxide or from 1,2-propylene oxide or mixtures thereof and their alkyl ethers of 1 to 18 carbon atoms per alkyl group which have molecular weights or average molecular weights between about 220 and 30,000, preferably between about 400 and 10,000. These polyalkylene glycol groups are found to provide the most effective detergent and wear inhibiting compositions.

The following polyalkylene glycol groups containing from 2 to 7 carbon atoms in each alkylene group are illustrative of the types described above.

$$L-(CH_2-CH_2-O)_5-OC_2H_5$$
$$L-(CH_2-CH_2-O)_7-CH_2CH_2N(C_2H_5)_2$$

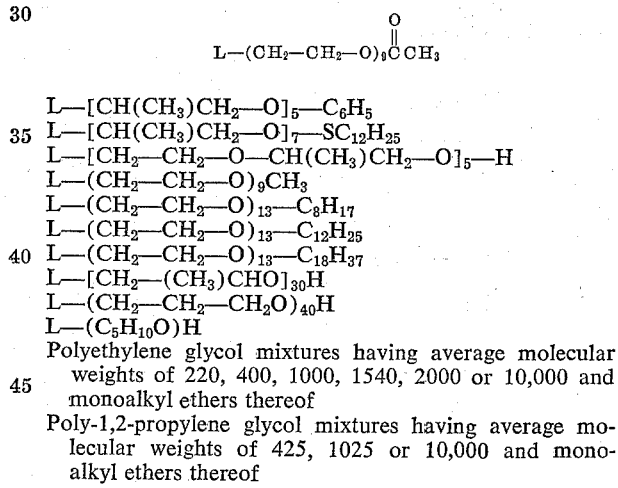

$$L-(CH_2-CH_2-O)_9\overset{O}{\overset{\|}{C}}CH_3$$

$$L-[CH(CH_3)CH_2-O]_5-C_6H_5$$
$$L-[CH(CH_3)CH_2-O]_7-SC_{12}H_{25}$$
$$L-[CH_2-CH_2-O-CH(CH_3)CH_2-O]_5-H$$
$$L-(CH_2-CH_2-O)_9CH_3$$
$$L-(CH_2-CH_2-O)_{13}-C_8H_{17}$$
$$L-(CH_2-CH_2-O)_{13}-C_{12}H_{25}$$
$$L-(CH_2-CH_2-O)_{13}-C_{18}H_{37}$$
$$L-[CH_2-(CH_3)CHO]_{30}H$$
$$L-(CH_2-CH_2-CH_2O)_{40}H$$
$$L-(C_5H_{10}O)H$$

Polyethylene glycol mixtures having average molecular weights of 220, 400, 1000, 1540, 2000 or 10,000 and monoalkyl ethers thereof Poly-1,2-propylene glycol mixtures having average molecular weights of 425, 1025 or 10,000 and monoalkyl ethers thereof In the above polyalkylene glycol groups L is the linking group, as already described, which connects the polyglycol portion to the hydrocarbon portion of the macromolecule in the polyglycol additive.

The predominantly aliphatic hydrocarbon macromolecules having polyglycol groups in accordance with the invention as already mentioned are most suitably polymeric additives. Although the polyglycol groups are operative without regard to any specific mode of attachment to the hydrocarbon portion of the additive, particularly suitable additives are obtained by copolymerization of an oil-solubilizing monomer (A) with a polyglycol (B) monomer having a polymerizable ethylenic linkage and a polyalkylene glycol group of the above-described type. More particularly, suitable polyglycol monomers are characterized by a hydrocarbon portion having a polymerizable ethylenic linkage which is connected to the polyglycol portion by a linking group of the aforementioned description.

Illustrative polyglycol monomeric compounds are the monoesters of α,β-unsaturated monocarboxylic acids of 3 to 15 carbon atoms and α,β-unsaturated, α,β-dicarboxylic acids of 4 to 12 carbon atoms. The preferred monocarboxylic acids are those containing from 3 to 8 carbon atoms and more particularly acrylic and methacrylic acids. The preferred dicarboxylic acids contain a total of from about 4 to 8 carbon atoms with maleic acid being particularly preferred.

Also included as suitable polyglycol monomers are the polyglycol amides of unsaturated monocarboxylic acids and dicarboxylic acids of the above-described types. Such monomers are obtained when the amide of an unsaturated acid is used as an initiator in the polymerization of the 1,2-alkylene oxides or mixtures thereof as mentioned above. The methacrylamide initiated polyalkyleneglycol is an example of these monomers.

The vinyl and allyl monoethers of polyglycols are also satisfactory polyglycol monomers. Such ethers are obtained by the reaction of acetylene with preformed polyglycol or by the use of unsaturated alcohols such as allyl alcohol as initiators in the polymerization of 1,2-alkyleneoxides or mixtures thereof. Examples of these monomers are allyl alcohol initiated polyethylene glycol and methallyl alcohol initiated polyethylene glycol.

Other types of monomers with other kinds of linking groups such as the phosphonyl and sulfonyl groups referred to above are also satisfactory for the polyglycol monomers.

In the preferred copolymeric type polyglycol macromolecules of the invention, the polyglycol ester monomers are particularly suitable. These monomers have a general structural formula,

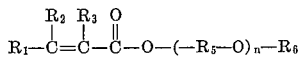

where $R_1$, $R_2$ and $R_3$ are hydrogen atoms or $C_1$–$C_4$ alkyl radicals, the $R_5$'s are 1,2-alkylene radicals of 2 to 7 carbon atoms, $n$ is an integer greater than 5, and $R_6$ is a hydrogen atom or a substituted or unsubstituted hydrocarbon group, the substituent groups here contemplated being the polar groups

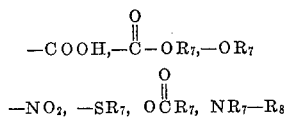

or

where the $R_7$'s and $R_8$'s are hydrogen atoms or hydrocarbon groups. For present purposes, however, a more perferred group of polyglycol ester monomers, previously referred to as (B) monomer compounds, is made up those compounds wherein, in the above structural formula, $R_1$ and $R_2$ represent hydrogen atoms, $R_3$ represents hydrogen or a methyl group, the $R_5$'s are ethylene or propylene groups, and $R_6$ is hydrogen or an alkyl group of from 1 to 18 carbon atoms.

The optional monomeric polar compounds previously designated as the (C) monomers, as already discussed, are monomers having a polymerizable ethylenic linkage and a polar group. Many such monomeric polar compounds for use in the production of polymeric detergents for lubricating oils have been recognized and may be incorporated in the additives of the present invention without adversely affecting the superior detergent and antiwear properties.

Our copending application Ser. No. 574,635, filed Mar. 29, 1956, and now abandoned, as mentioned above, describes the inclusion of free unsaturated monocarboxylic acid monomers in polyglycol type copolymers. The monomer of (A) dodecyl methacrylate, (B) dodecyl ether of polyethylene glycol monomethacrylate in which the polyethylene glycol has a molecular weight of 1600, and (C) methacrylic acid is illustrative. Copending application Ser. No. 645,887, filed Mar. 14, 1957, and now abandoned, describes polyglycol containing copolymers including free dicarboxylic acid monomers or their anhydrides such as the copolymer of (A) allyl stearate and didodecylmaleate, (B) dodecyl nonaethylene glycol maleate, and (C) maleic anhydride. Copending application Ser. No. 645,888, filed Mar. 14, 1957, and now abandoned, describes polyglycol copolymers including amino and hydroxy-substituted alkyl esters of unsaturated carboxylic acid as illustrated by the copolymer of (A) dodecyl methacrylate, (B) dodecyl ether of polyethylene glycol monomethacrylate in which the polyethylene glycol has a molecular weight of 1600, and (C) ethylene glycol monomethacrylate. Copending application Ser. No. 646,524, filed Mar. 18, 1957, and now abandoned, describes polyglycol copolymers including amide and amine salts of unsaturated acids which amides and amine salts may contain hydroxyalkyl and monoalkyl substituents as illustrated by the copolymer of (A) dodecyl methacrylate, (B) dodecyl ether polyethylene glycol monomethacrylate in which the polyethylene glycol has a molecular weight of 1600, and (C) N,N'-dimethyl amino propyl amine methacrylate.

Although the optional polar groups other than the polyglycol group of the additives of the invention are incorporated into the macromolecule by various suitable methods known to the art, the preferred additives are copolymers containing copolymerized polar group monomers other than the polyglycol monomers referred to above. In addition to the free carboxylic acid monomers and amino and hydroxy-substituted alkyl esters, amides and amine salts of unsaturated acids of the copending applications already noted, suitable polar group monomers besides the polyglycol monomers include the heterocyclic nitrogenous monomers such as vinyl pyridine, vinyl pyrrolidone and vinyl carbazole. Epoxy ether and ester monomers such as glycidyl vinyl ether and glycidyl methacrylate are also illustrative of suitable polar monomers in combination with the polyglycol group monomers. Various alkyl derivatives of the polar monomers are likewise satisfactory as in the case where lower alkyl groups are substituted on the ring of the heterocyclic nitrogenous monomers. Combinations of the aforementioned polar groups are also included, as for example where both a vinyl pyrrolidone and a dialkyl aminoalkyl ester of unsaturated carboxylic acid are used together with the polyglycol monomer and the oil-solubilizing monomer.

In preparing the polyglycol additives of this invention, it is important to obtain a final product which is oil soluble, i.e., which is soluble in the petroleum or other lubricating oil employed, to the extent of at least 0.5%, and preferably 2% or more by weight. Since the various oil-solubilizing aliphatic hydrocarbon groups, for example, the oil-solubilizing monomer components of the polymeric type macromolecular polyglycol additives, differ somewhat in their oil-solubilizing characteristics, preliminary tests are made with the additive to determine whether the relative proportion of aliphatic hydrocarbon, or of oil-solubilizing monomer compound in the copolymer, is high enough to impart the desired degree of oil-solubility. If the solubility in oil is unduly low the proportion of aliphatic hydrocarbon groups is easily increased to raise the oil solubility to the desired level. In copolymers of the ester type in which there remain uncombined carboxyl groups in the copolymer, the oil-solubility thereof can normally be remedied by esterifying a portion of said carboxyl groups with a higher alcohol, e.g., a $C_8$ or higher aliphatic alcohol such as n-octanol, 2-ethylhexanol, decanol, dodecanol (lauryl alcohol) or the like.

In general, however, satisfactory oil-solubility, antiwear and detergency properties are obtained with polymers wherein the (A), or oil-solubilizing component constitutes from about 40 to 99.9 weight percent of the overall polymer composition, with the (B) and (C), or polar polyglycol monomers and other polar monomer components representing a total of from 60 to 0.1 weight percent of the polymer composition, there being in all cases at least one and usually several monomer units of said (B) polyglycol monomer components in the copolymer. Expressed percentagewise, of the total polar monomer content of the copolymer, the (B), or polyglycol component constitutes from 100 to 3 weight percent, while the (C), or other polar component constitutes from 0 to 97 weight percent. By a careful program of exploratory research, supported by engine testing data, preferred ranges can be established within the aforesaid ranges for particular polymers and classes of polymers coming within the scope of this invention. Thus, with copolymers of (A), a higher alkyl methacrylate (e.g., lauryl methacrylate), (B) an acrylate or methacrylate of a polyethylene glycol or a polypropylene glycol, or a monoalkyl ether of said glycols, or mixture of said glycols or glycol ethers, or a polyglycol monoether, where the glycols are of the molecular weights previously specified for these compounds, and (C) other polar monomers of the previously described types, there preferably is employed from 80 to 96 weight percent of the oil-solubilizing, (A) component. The balance or polar portion of the polymer, taken on the basis of 100 weight percent polar portion, is made up from 35 to 100 weight percent of the (B) component and 65 to 0 weight percent of the (C) component.

Although effetcive copolymers according to the invention are obtained with proportions of oil-solubilizing (A) monomer units and polar (B) and (C) monomer units within the aforementioned ranges, it has been noted that in a preferred application of the copolymeric lubricating oil detergent additives of the present invention in mineral lubricating oil, a certain optimum relationship appears to exist between the total number of solubilizing aliphatic carbon atoms and the total number of polar groups within the molecule. This optimum relationship which is termed "polar balance" for convenience, is expressed by the formula $$PB = \frac{\Sigma(N_p \times P)}{N_s}$$

in which $PB$=polar balance, $N_p$=number of a certain polar group, $P$=polarity constant for the polar group, $N_s$=number of solubilizing aliphatic carbon atoms.

The polarity constant for free carboxyl polar groups (—COOH) is 100. For hydroxyl polar groups, the polarity constant is 50. For alkylene oxide groups (—RO—, where R is an alkylene group, preferably ethylene or propylene), the polarity constant is 15. The solubilizing aliphatic carbon atoms to be considered are the following:

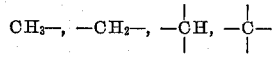

and excluding aromatic ring carbon atoms and the carbon atoms of carbonyl groups.

The polar balance of a given copolymer according to the above formula is equal to the sum of the number of each type of polar group multiplied by its polarity constant, said sum being then divided by the number of solubilizing aliphatic carbon atoms. For best performance, the polar balance is approximately 1. However, very effective copolymeric lubricating oil detergent additives may have polar balance in the range from 0.15 to 3.00.

The macromolecules employed in the compositions of this invention can be prepared by any one one of several methods, as known in the art. As indicated above, the oil-solubilizing groups, the polyglycol groups and the optional polar groups of the macromolecules are attached in various ways. In the case of the essential polyglycol groups there are thre general methods of attachment. (1) The polyglycol group may be incorporated by reaction with a preformed ploymer containing reactive centers such as free carboxyl groups. (2) The polyglycol group may also be introduced as a polymerizable monomer prepared by (a) reacting a polyglycol compound with a reactive monomer such as methacrylyl chloride or methacrylic acid, or (b) initiating alkylene oxide polymerization with a suitable compound containing a polymerizable double bond, such as allyl alcohol. (3) The polyglycol group may also be incorporated in a similar fashion by initiating the alkylene oxide polymerization with a preformed polymer containing reactive centers as described in (1). In the case of the oil-solubilizing groups and the optional polar groups the methods of attachment would be the same except for the alkylene oxide polymerization.

Thus, one may polymerize a mixture of the desired monomer components to form the desired polymer. Satisfactory copolymers are also obtained, however, by starting with suitable precursor compounds, with the desired monomer units then being formed by the appropriate treatment of the resulting polymeric intermediate product. Thus, one may first copolymerize a given oil-solubilizing compound such as an alkyl methacrylate with a suitable acid component such as methacrylic acid or maleic anhydride and some other polar component such as pyrrolidone; the resulting polymer is then reacted with a polyalkylene glycol whereby a portion or all of the free —COOH groups in the polymer intermediate become monoester-linked to the polyalkylene glycol.

The general principles of preparation outlined above are applicable to all types of macromolecules according to the invention. Other possible variations in the nature of the reactants and in the selection of a suitable reaction path would obviously suggest themselves to those skilled in the art.

When the polymeric additive of this invention, or a suitable polymeric intermediate, is to be prepared by reaction of monomeric components, said polymers can be prepared by conventional bulk, solution or emulsion methods in the presence of an addition polymerization initiator. Preferably, however, the copolymerization is effected in an inert organic solvent such as benzene, toluene, xylene or petroleum naphtha in the presence of a free radical-liberating type of initiator such as a peroxy compound, for example, benzoyl peroxide, acetyl peroxide, tert. butyl hydro-peroxide, di-tert. butyl peroxide, dibenzoyl peroxide, or di-tert. amyl peroxide, or an azo initiator such as 1,1'-azodicyclohexane-carbonitrile or $\alpha,\alpha'$-azodiisobutyronitrile. The catalyst, or polymerization initiator, can be employed in an amount of from about 0.1 to 10%, with a preferred range being from 0.10 to 2%. If desired, the catalyst can be added in increments as the reaction proceeds. Likewise, additional portions of the solvent can also be added from time to time in order to maitain the solution in a homogenous condition. The temperature of copolymerization varies from about 100 to 300° F., with the optimum temperature for any given preparation depending on the nature of the solvent, the concentration of monomers present in the solvent, the catalyst, and the duration of the reaction. Much the same conditions are employed when the copolymerization is effected in bulk rather than in the presence of an inert solvent.

Other types of polymeric macromolecules within the scope of the invention as described above include the condensation polymers such as linear polyamides and polyesters having linked thereto suitable oil-solubilizing groups, polyglycol groups and polar groups of the aforementioned kinds. Such polyamides and polyesters are obtained by the well known condensation reactions of polybasic acids, polyamines, polyhydric alcohols, amino acids, amino alcholos, and the like. For example, the condensation of tartaric acid with ethylene diamine gives a linear polyamide having hydroxyl groups along the linear chain which may be used to introduce appropriate oil-solubilizing groups and polar groups.

The additives of the invention have apparent molecular weights as determined by standard light scattering methods of at least 50,000. For practical purposes, molecular weights of from 100,000 to 1,000,000 are most suitable from the standpoint of viscosity and other physical characteristics of the polymeric additives.

Typical methods for preparing the polyglycol polymeric type additives which can be employed with success as detergents and antiwear additives in lubricant compositions according to the invention are given in the following examples.

Example I

In this operation a homopolymer of dodecyl methacrylate was employed as the starting material from which was prepared a copolymer intermediate of dodecyl methacrylate and methacrylic acid. The preparation was as follows: A solution of 14 grams of potassium hydroxide in 300 cc. of 2-ethylhexanol was prepared, and to this solution was added 800 cc. of a 40% solution in mineral oil of the methacrylate homopolymer, this amount of KOH constituting a slight excess over that theoretically required to effect the desired saponification of approximately 12% of the ester groups present in the polymer. The resulting solution was heated to 320° F. and maintained at this temperature, with stirring, for 10 hours. To this solution was then added 50 cc. of benzene along with a 50% excess of 6 N HCl over the amount theoretically required to liberate the free carboxyl groups from the corresponding salt. The acidified solution was then refluxed for two hours, after which it was cooled, diluted with ethyl ether, and water washed (along with a small amount of ethyl alcohol to break the emulsion) until neutral to litmus. The ether and dodecyl alcohol present in the solution were then distilled off, leaving as the oil-soluble residue a copolymer of dodecyl methacrylate and methacrylic acid wherein said components were present in a monomer ratio of 7.5:1, respectively. 140 grams of the resulting polymer intermediate were then dissolved in 250 grams of xylene and 60 grams of benzene, and to the resulting solution was added 60 grams of a mixture of polyethylene glycol compounds consisting of major portions of nonaethylene glycol and having an average molecular weight of about 400, together with one-half gram of the esterification catalyst p-toluene sulfonic acid. This mixture was refluxed at 270° F. for 10 hours, after which a sufficient quantity of solvent was distilled off to raise the reflux temperature to 335° F., with the refluxing being continued for three hours at this temperature. The reaction mixture was then cooled and dissolved in an equal volume of benzene, from which solution the polymer was then precipitated out by the addition of five times the volume of a 4:1 acetone-methanol mixture. This polymer incorporated dodecyl methacrylate, methacrylic acid and polyethylene glycol monomethacrylate monomer units in the approximate proportions of 7.5:0.85:0.15, respectively. The viscosity blending characteristics of this product are substantially the same as those of the dodecyl methacrylate homopolymer, indicating little change in molecular weight. In FL–2 tests, this polymer had an average Piston Varnish Rating of 7.5. Further, the wear sustained by the piston rings during this test was found to be but 2.6 mgs./hr. as compared with a value of 5.5 mgs./hr. for the base oil alone.

Example II 155 g. (0.5 mole) of vinyl stearate, 2.7 g. (0.021 mole) of itaconic acid, 14.8 g. (0.021 mole) of tridecyl-capped polyethylene glycol methacrylate (molecular weight 708), and 200 cc. of butanone were charged to a three-necked reaction flask fitted with a stirrer, thermometer, reflux condenser, and dropping funnel. The mixture was stirred and heated to reflux temperature, 188° F. A solution of 3.4 g. of benzoyl peroxide in 30 cc. of butanone was added during a period of 2 hours. No apparent thickening occurred during this time. On the removal of 180 cc. of solvent, polymerization proceeded. The temperature was raised to 220–225° F. and kept at this temperature for 2 hours. 1.7 g. of bulk catalyst was then added in small installments over a period of an hour. Additional thickening occurred on stirring the mixture at 220° F. for another 3 hours. 700 cc. of benzene was added to the mixture, and the polymer was precipitated with 5 volumes of methanol. The recovered product was taken up in mineral lubricating oil to give 144 g. of polymer as a 52% concentrate. Analyses of the concentrate indicated that the polymer contained vinyl stearate, itaconic acid, and tridecyl ether of decaethylene glycol methacrylate in a molar ratio of approximately 68:4:3.

Example III 75.5 g. (0.3 mole) of octadecene, 63 g. (0.3 mole) of di-2-ethylhexyl fumarate, 8.2 g. (0.095 mole) of crotonic acid, and 16.3 g. (0.23 mole) of tridecyl-capped polyethylene glycol methacrylate (molecular weight 708) were charged to a polymerization reactor as described in the preceding example. The mixture was stirred and heated to 220–225° F. with stirring. Bulk benzoyl peroxide was added intermittently in 0.8 g. installments during the course of 7 hours. The mixture was then kept at 194° F. for a period of 88 hours. The product obtained above was stripped to 425° F. at 1 mm. mercury to remove unreacted crotonic acid, octadecene, and di-2-ethylhexyl fumarate. 136 g. of polymer was obtained which was shown by analysis to contain octadecene, di-2-ethylhexyl fumarate, crotonic acid, and tridecyl ether of decaethylene glycol methacrylate in a molar ratio of 10:15:3:1.

Example IV

A three-necked flask fitted with a stirrer, thermometer, reflux condenser, and dropping funnels was charged with 29.6 g. (0.35 mole) of hexene-1. The monomer was stirred and heated to reflux, 146° F. A monomer mixture comprised of 89 g. (0.35 mole) of lauryl methacrylate, 1.2 g. (0.014 mole) of methacrylic acid, and 61.2 g. (0.059 mole) of dodecyl-capped polyethylene glycol methacrylate (molecular weight 1034), in 30 cc. of benzene was added to the refluxing hexene simultaneously with the addition of a catalyst solution. After the addition of 100 cc. of the monomer mixture and approximately 0.45 g. of benzoyl peroxide in 5 cc. of benzene over a period of 2 hours, no polymerization was observed. During the course of addition, the temperature gradually rose, and after another two hours the maximum temperature reached was 187° F. Considerable thickening occurred during this time and it was necessary to add xylene diluent in small portions at intervals to facilitate stirring. The mixture was kept at 190° F. for another three hours. At this point 177 g. of lubricating oil was added. The solvent and unreacted hexene, lauryl methacrylate and methacrylic acid were distilled from the mixture to give 140 g. of polymer as a 44% concentrate. The polymer was shown by analyses to contain hexene, lauryl methacrylate, methacrylic acid, and dodecyl-capped polyethylene glycol methacrylate in a molar ratio of 17:25:2:4.

Example V 1.9 kg. of phenol was mixed with 4 kg. of polyisobutylene having an average molecular weight of about 400. The polyisobutylene corresponded roughly to heptaisobutylene. To this mixture 90 g. of a boron trifluoride phenol complex was added to catalyze the alkylation. An additional 90 g. of catalyst was added after the reaction mix had stood at 60° C. for 4 hours. The heating was continued for another 3 hours and 2.5 liters of a 10% solution of potassium carbonate was then added to the mixture. This mixture was stirred for half an hour, after which the potassium carbonate solution was withdrawn and the alkylated phenol was washed with hot water until the water washes were neutral. The mixture was then stripped of water and other volatile material by heating to 320° F. under a vacuum of 3 mm. of mercury. The yield of washed product was 4215 grams and the equivalent weight was 620.

4100 g. of the alkyl phenol obtained above was mixed with 21 g. of sodium hydroxide and the mixture added to a bomb which was heated to 100° C. 415 g. of ethylene oxide was charged to the bomb. This addition of ethylene oxide was carried out over a period of 1½ hours in order to maintain the temperature of the exothermic reaction below 125° C. After charging all of the ethylene oxide, the bomb was rocked to insure mixing of the reactants for 4 hours. The product from the bomb was neutralized with glacial acetic acid and washed, yielding 4467 g. of alkylated phenoxyethanol having an equivalent weight of 736 as determined by hydroxyl number value.

The alkylphenoxyethanol was converted to methacrylate ester by reaction with methacrylic acid. 400 g. of the alkylphenoxyethanol, 215 g. methacrylic acid, 400 cc. of benzene, 5 g. of hydroquinone and 3 cc. of sulfuric acid were mixed and heated under reflux at about 200° F. for about 20 hours. The theoretical amount of water was evolved. The contents of the vessel were filtered and stripped at 400° F. under 6 mm. of mercury pressure. The stripped product was washed with sodium hydroxide and then with water until the water was neutral. It was then reheated to 220° F. under a pressure of 6 mm. of mercury to remove final traces of water. The yield was about 400 g.

100 g. of the alkylphenoxyethyl methacrylate obtained above, 5½ g. of methacrylic acid, 30 g. of dodecyl ether of decaethylene glycol methacrylate and 1.4 g. of benzoyl peroxide were charged to a flask and blanketed with an inert atmosphere of nitrogen. Benzene was added to reduce the viscosity and the contents of the flask refluxed at about 197° F. for 3½ hours. Methanol was then added to the benzene solution to precipitate a viscous polymer product. The separated polymer was admixed with a mineral lubricating oil having a viscosity of 150 SSU at 130° F. The yield of lubricating oil polymer concentrate was 245 g. The polymer was a copolymer of heptaisobutylene - phenoxyethyl methacrylate - methacrylic acid-dodecyl ether of decaethylene glycol methacrylate with a ratio of 20:7:5.

Other polymers illustrative of the compositions of the invention were prepared according to the procedures outlined in the above examples. These polymers are referred to in the tables which follow where they are described with respect to the particular monomers and mole ratios employed.

In general, excellent detergent and antiwear properties can be imparted to lubricating oils by dissolving therein a quantity of from about 0.1 to 10% by weight of the polymers of the type described above, although a preferred range is from about 1 to 5% by weight. On the other hand, since the polymers of this invention are unusually compatible with mineral and other lubricating oils in substantially all proportions, as much as 75% of the present polymeric additives can be dissolved in a suitable lubricating oil for the purpose of preparing a concentrate capable of dilution with lubricating oils and the like to prepare the final lubricant composition. Such concentrates, which may also contain other additives in desired amounts, and which normally contain at least 10% of the polymer, comprise a convenient method for handling the polymer and may be used as a compounding agent for lubricants in general.

The polymeric additives of this invention can be used with good effect in the case of any one of a wide variety of oils of lubricating viscosity, or of blends of such oils. Thus, the base oil can be a refined Pennsylvania or other paraffin base oil, a refined naphthenic base oil, or a synthetic hydrocarbon or nonhydrocarbon oil of lubricating viscosity. As synthetic oils there can be mentioned alkylated waxes and similar alkylated hydrocarbons of relatively high molecular weight, hydrogenated polymers of hydrocarbons, and the condensation products of chlorinated alkyl hydrocarbons with aryl compounds. Other suitable oils are those which are obtained by polymerization of lower molecular weight alkylene oxides such as propylene and/or ethylene oxide. Still other synthetic oils are obtained by etherification and/or esterification of the hydroxy groups in alkylene oxide polymers such as, for example, the acetate of the 2-ethylhexanol-initiated polymer of propylene oxide. Other important classes of synthetic oils include the various esters as, for example, di-(2-ethylhexyl)sebacate, tricresyl phosphate and silicate esters. If desired, the oil can be a mixture of mineral and synthetic oils.

While satisfactory lubricant compositions can be obtained by adding to the base oil employed only one or more of the polymeric additives of the type described above, it also falls within the purview of this invention to provide lubricant compositions which contain not only such polymers, but also other additives such as pour point depressants, oiliness and extreme pressure agents, anti-oxidants, corrosion inhibiting agents, blooming agents, thickening agents, and/or compounds for enhancing the temperature-viscosity characteristics of the oil. The present invention also contemplates the addition to the lubricant composition (particularly when the amount of copolymer employed is relatively small) of auxiliary detergents and/or antiwear agents.

Illustrative lubricant compositions of the above type containing the copolymeric additives of the invention in combination with other agents may include, for example, from about 0.1 to 10% by weight of alkaline earth metal higher alkylphenate detergent and wear reducing agents such as calcium alkylphenates having an average of approximately 14 carbon atoms in the alkyl group as well as organic thiophosphate corrosion and high temperature oxidation inhibitors such as the reaction product of pinene and $P_2S_5$ and the bivalent metal dihydrocarbyl dithiophosphates, zinc butyl hexyl dithiophosphate and zinc tetradecylphenyl dithiophosphate in amounts of from about 0.1 to 10% by weight of the composition. Temperature-viscosity improving agents which may be employed in the compositions, usually in amounts of from about 1 to 10% by weight, include by way of example the homopolymers of alkyl methacrylates such as the dodecyl methacrylate polymers, and high molecular weight butene polymers.

The efficacy of polymeric additives of the type described above as detergents and antiwear agents in lubricating oils is illustrated by data from a number of tests. In the tests from which the data is obtained, the base oil, unless otherwise specified, is a solvent-refined, wax-free SAE-30 grade mineral lubricating oil having a viscosity index of 85 which is derived from California waxy crude. Various amounts of the polymeric additives are incorporated into the oil as noted in terms of percent by weight.

In the Lacquer Deposition Test the low temperature detergency of the oils tested is measured by determining the ability of the oil to solubilize and retain typical engine fuel deposits and precursors thereof which are formed due to incomplete combustion of the fuel. Retention of these deposits in a given oil depends upon their dispersal and upon minimizing their polymerization to lacquer.

Briefly described, the Lacquer Deposition Test involves condensing fresh cool flame oxidation products from a standard test fuel simulating the fuel combustion products of an internal combustion engine in a steel vessel containing a certain amount of the lubricating oil being tested. The steel surface of the vessel acts as an iron catalyst for polymerization of the fuel oxidation products to lacquer in the same manner as the steel surfaces in an internal combustion engine. After the oxidation products have been condensed, the steel vessel containing the lubricating oil is heated for 24 hours at a temperature selected to correspond with actual engine conditions. The test oil is then decanted while hot from the lacquer deposits formed in the steel vessel due to polymerization and the lacquer deposits are de-oiled and weighed.

In the actual test a low grade gasoline is employed of the type described in connection with the standard FL-2 test procedure given below. The gasoline at a rate of 13.3 cc. per hour is vaporized and mixed with air, the air rate being 1.75 liters per minute. The vapor mixture of the gasoline and air is then fed into an elongated cool flame combustion chamber of standard design having a diameter of 1½ inches. The cool flame combustion chamber is maintained at 695° F. The test is continued for 1 hour during which the oxidation products issuing from the cool flame combustion chamber are condensed into the weighed steel catalyst vessel which contains 30 g. of the oil being tested at about room temperature. The steel vessel containing test oil and condensed oxidation products is then heated for 24 hours at 110° F. The oil is decanted from the lacquer deposits in the vessel, following which the deposits are de-oiled by washing with petroleum solvent. The increase in weight of the steel vessel due to the lacquer deposits is then determined and recorded in milligrams as "LD" or "Lacquer Deposit."

The Lacquer Deposit for any given lubricant composition obtained in accordance with the procedure described above is directly correlated to the "Piston Varnish Rating" or "PVR" obtained for the same lubricant composition in the standard FL-2 test procedure previously referred to and hereinafter more particularly described. Table II which follows gives the correlated values for both the Lacquer Deposits and Piston Varnish Ratings.

TABLE II

| LD | PVR | LD | PVR |
|---|---|---|---|
| 140 | 9.5 | 335 | 6.0 |
| 170 | 9.0 | 370 | 5.5 |
| 190 | 8.5 | 420 | 5.0 |
| 220 | 8.0 | 480 | 4.5 |
| 245 | 7.5 | 570 | 4.0 |
| 275 | 7.0 | 700 | 3.5 |
| 305 | 6.5 | 850 | 3.0 |

The correlated values in the above table provide an accurate means for estimating from the Lacquer Deposits determined for a given oil the Piston Varnish Rating to be obtained in the standard FL-2 Chevrolet engine test.

In the test where the Piston Varnish Ratings are obtained, a given lubricating oil composition is tested as the crankcase lubricant in a 6-cylinder Chevrolet engine using a low grade gasoline especially prone to cause engine deposits, the conditions being those defined in the standard FL-2 test procedure as described in the June 21, 1948, report of the Coordinating Research Council. This procedure requires the maintenance of a jacket temperature of 95° F. and a crankcase oil temperature of 155° F. at 2500 r.p.m. and 45 brake horsepower of 40 hours, and therefore closely simulates the relatively "cold" engine conditions which are normally experienced in city driving. At the end of each test, the engine is dismantled and the amount of engine deposits on the piston determined and expressed as the Piston Varnish Rating. This value is obtained by visually rating (on a scale of 0 to 10, with 10 representing the absence of any deposit) the amount of deposit on each piston skirt and averaging the individual ratings so obtained for the various pistons. Under the conditions of this test, a Piston Varnish Rating of 4.5 is indicative of satisfactory performance, though preferably this rating should be 5 or above. The wear experienced by the piston rings during the test is also measured in certain cases and expressed in mgs. of metal lost per hour. 5 mgs. per hour is regarded as satisfactory, though preferably the loss should be 3 mgs. or less per hour. In the case of the base oil alone without the addition of any additives it is found that the Piston Varnish Rating is approximately 3.0 and the piston ring weight loss is 5.5 mgs./hr. On the other hand, as indicated by the data presented in the tables below, when the base oil is compounded with the indicated amounts of a copolymer, greatly superior results are obtained.

In the tables which follow, Table III gives the test data showing Piston Varnish Ratings of various lubricant compositions, and Table IV gives the test data showing Lacquer Deposit.

TABLE III

| Lubricant Composition | Ratio of (1) Monomer to (2) Monomer to (3) Monomer, etc. | Piston Varnish Rating |
|---|---|---|
| Base oil alone | | 3.0 |
| 1.5% Copolymer of (1) dodecyl methacrylate, (2) methacrylic acid and (3) nonaethylene glycol methacrylate in base oil. | 23/3/1 | 4.7 |
| 1.5% Copolymer of (1) dodecyl methacrylate, (2) methacrylic acid and (3) nonaethylene glycol methacrylate in base oil. | 39/6/1 | 8.3 |
| 1.5% Copolymer of (1) dodecyl methacrylate, (2) methacrylic acid and (3) dodecylether of decaethylene glycol methacrylate in base oil. | 75/10/1 | 7.7 |
| 1.5% Copolymer of (1) tridecyl methacrylate, (2) octadecyl methacrylate, (3) methacrylic acid and (4) octadecylether of eicosaethylene glycol methacrylate in base oil. | 14/9/2/1 | 7.6 |
| 3.6% Copolymer of (1) tridecyl methacrylate, (2) octadecyl methacrylate and (3) dodecylether of decaethylene glycol methacrylate in base oil.[1] | 7/4/1 | 7.0 |
| 0.8% Copolymer of (1) tridecyl methacrylate, (2) octadecyl methacrylate and (3) dodecylether of dooctacontahekataethylene glycol methacrylate in base oil.[2] | 108/72/1 | 8.8 |
| 0.8% Copolymer of (1) tridecyl methacrylate, (2) octadecyl methacrylate and (3) dodecylether of triheptacontadohekataethylene glycol methacrylate in base oil.[2] | 281/187/1 | 6.3 |
| 1.5% Copolymer of (1) heptaisobutylene phenoxyethyl methacrylate, (2) methacrylic acid and (3) dodecylether decaethylene glycol methacrylate in base oil. | 10/4/2 | 5.8 |
| 1.5% Copolymer of (1) dodecyl methacrylate, (2) methacrylic acid and (3) methoxy (mixed polyethylene glycol-polypropylene glycol in approx. 1:1 mole ratio having an av. mol. wt. of approx. 400) methacrylate in base oil. | 17/2/1 | 5.1 |
| 1.5% Copolymer of (1) dodecyl methacrylate, (2) methacrylic acid and (3) octapropylene glycol methacrylate in base oil. | 42/7/1 | 4.2 |
| 1.5% Copolymer of (1) dodecyl methacrylate, (2) methacrylic acid and (3) decylthiononaethylene glycol methacrylate in base oil. | 35/4/1 | 4.2 |
| 1.5% Copolymer of (1) dodecyl methacrylate, (2) acrylic acid and (3) methacrylate of dodecyl monoether of decaethylene glycol (Av. Mol. Wt. 440) in base oil. | 7.5/0.8/0.2 | 8.6 |
| 1.5% Copolymer of (1) (alkylphenoxy)[a]-ethyl methacrylate, (2) methacrylic acid and (3) methacrylate of lauryl monoether of polyethylene glycol (Av. Mol. Wt. 440) in base oil. | 8/0.8/0.2 | 7.8 |

See footnotes at end of table.

TABLE III—Continued

| Lubricant Composition | Ratio of (1) Monomer to (2) Monomer to (3) Monomer, etc. | Piston Varnish Rating |
|---|---|---|
| 1.5% Copolymer of (1) dodecyl methacrylate, (2) methacrylic acid, (3) heptadecenyl-2-hydroxyethyl imidazoline methacrylate and (4) dodecyl ether of decaethylene glycol methacrylate in base oil. | 7/0.7/0.1/0.25 | 4.7 |
| 1.2% Copolymer of (1) tridecyl methacrylate, (2) octadecyl methacrylate, (3) methacrylamide and (4) tridecyl ether of decaethylene glycol methacrylate in base oil. | 4/3/0.7/0.3 | 5.6 |
| 2.5% Copolymer of (1) dodecyl methacrylate, (2) allyl stearate, (3) mono(methoxy dodecaethylene glycol) maleate and (4) maleic anhydride in base oil. | 20/1/1/1 | 5.2 |

[1] 140 Neutral mineral lubricating oil and 18 millimoles per kg. zinc butylhexyl dithiophosphate.
[2] 150 Neutral mineral lubricating oil, 27 millimoles per kg. calcium alkyl phenate sulfurized having an average of 13 carbon atoms per alkyl group derived from propylene polymer, 12 millimoles per kg. zinc butylhexyl dithiophosphate and 5.7% Acryloid 763.
*Prepared by alkylating phenol with polybutylene (Av. $C_{14}$ per molecule) over $BF_3$ catalyst.

TABLE IV

| Lubricant Composition | Ratio of (1) Monomer To (2) Monomer To (3) Monomer, Etc. | Lacquer Deposit (milligrams) |
|---|---|---|
| Base oil alone | | 850 |
| 2.8% Copolymer of (1) dodecyl methacrylate, (2) mono-(dodecyloxy) hexadecaethylene glycol maleate and (3) maleic anhydride in base oil. | 40/1/1 | 450 |
| 2.8% Copolymer of (1) dodecyl methacrylate, (2) acrylic acid, (3) tridecyl ether of decaethylene glycol methacrylate and (4) N-2-hydroxyethyl methacrylamide in base oil. | 24/1/1/1 | 286 |
| 2.8% Copolymer of (1) tricedyl methacrylate, (2) octadecyl methacrylate, (3) methacrylic acid, (4) tridecyl ether of hexadecaethylene glycol methacrylate, and (5) N,N-diethylaminoethyl methacrylate in base oil. | 14/10/1/1/1 | 244 |
| 2.8% Copolymer of (1) dodecyl methacrylate, (2) tridecyl ether of decaethylene glycol methacrylate, and (3) ethylene glycol monomethacrylate in base oil. | 14/1/1 | 160 |

The utility of still other lubricant compositions in accordance with the invention in which various representative oils of lubricating viscosity are employed is illustrated by the additional examples given in the following table:

TABLE V

| Lubricant Composition | Base Oil | Ratio Of (1) Monomer To (2) Monomer To (3) Monomer, etc. | Viscosity at 100° F. SSU | Viscosity at 210° F. SSU | Viscosity Index |
|---|---|---|---|---|---|
| Base oil alone | Mixed hexyloctyl orthosilicate. | | 45.2 | 33.5 | 183 |
| 2.8% Copolymer of (1) octadecene, (2) di-2-ethylhexyl fumarate, (3) crotonic acid and 4) tridecylether of decaethylene glycol; methacrylate in base oil. | do | 10/15/3/1 | 47.5 | 34.3 | 210 |
| Base oil alone | Octyloxyoctapropylene glycol acetate. | | 86.6 | 39.8 | 170 |
| 2.8% Copolymer of (1) hexene, (2) dodecyl methacrylate, (3) methacrylic acid and (4) dodecylether of octadecaethylene glycol methacrylate in base oil. | do | 17/25/2/4 | 128.6 | 47.7 | 170 |
| Base oil alone | Dioctylphthalate | | 138.8 | 40.3 | 10 |
| 2.8% Copolymer of (1) hexene, (2) dodecyl methacrylate, (3) methacrylic acid and (4) dodecylether of octadecaethylene glycol methacrylate in base oil. | do | 17/25/2/4 | 256.1 | 35.3 | 125 |

From the tests of the foregoing table it will be seen that each of the illustrative compositions containing the copolymeric lubricating oil additives according to the invention possess improved lubricating properties compared to the base oils alone.

The outstanding dispersant properties of the polyglycol macromolecular additives of the invention are also illustrated by the following examples showing their efficacy in the standard Asphaltene Test.

In the Asphaltene Test, 5 cc. of a 5% solution of the dry polyglycol polymeric additive is mixed with 2 cc. of a 1% solution of airblown Midway Asphalt in benzene. The mixture is diluted to 25 cc. with n-pentane. This diluted mixture is shaken up and observed for two minutes. If no coagulation occurs, 2 cc. of glacial acetic acid is added and the time to the first coagulation of asphalt is recorded. The results of the Asphaltene Test correlate with the Piston Varnish Rating and the Lacquer Deposit for the polyglycol additives as noted above. With the base oils alone coagulation occurs immediately. Coagulation times of 30 minutes or more indicate effective dispersants.

In the examples which follow, identical polymerization conditions were employed in the preparation of the polyglycol additives unless otherwise noted. Average molecular weights were obtained from viscosity measurements.

*Example VI*

This example illustrates a typical preparation of the copolymer of dodecyl methacrylate with dodecyl ether-capped polyethylene glycol (1600 mol. wt.) methacrylate and its evaluation as a dispersant.

Into a 500 cc. three-necked flask equipped with mechanical stirrer, reflux condenser, and buret was charged 106 g. dodecyl methacrylate (0.418 mole), 14 g. dodecyl ether-capped polyethylene glycol (1600 mol. wt.) methacrylate (0.0075 mole) and 213 g. benzene. 0.01% $\alpha,\alpha'$-azodiisobutyronitrile was then charged. The polymerization was run at reflux after sweeping out the system with nitrogen. Reaction temperature was 88° C. $\alpha,\alpha'$Azodiisobutyronitrile was added in increments every 15 minutes to maintain a constant catalyst level.

Conversion in 7½ hours was 86%. The product had an alkyl to dodecyl ether-capped polyethylene glycol (1600 mol. wt.) methacrylate ratio of 88:1, and 2.8% in 150 neutral gave a viscosity of 267 SSU at 100° F. and 58.2 SSU at 210° F. It had an average molecular weight of approximately 280,000. The Asphaltene Test time was 1½ hours.

Example VII

This example shows the copolymerization of dodecyl methacrylate, dodecyl ether-capped polyethylene glycol (1600 mol. wt.) methacrylate, and N-vinyl pyrrolidone.

Charge:
    106 g. dodecyl methacrylate
    14 g. dodecyl ether-capped polyethylene glycol (1600 mol. wt.) methacrylate
    2.4 g. N-vinyl pyrrolidone
    209 g. benzene
Catalyst level 0.008%
Conversion in 8 hours was 92%
Product contains 0.08% nitrogen
Ratio 96:1:1.4
2.8% in 150 neutral gave viscosity at:
    100° F., 259 SSU
    210° F., 58.1 SSU
    V.I. 142
Average molecular weight 280,000
Asphaltene Test, 1¼ hours

Example VIII

This example shows the copolymerization of dodecylmethacrylate, dodecyl ether-capped polyethylene glycol (1600 mol. wt.) methacrylate, and 4-vinyl pyridine.

Charge:
    106 g. dodecyl methacrylate
    13.5 g. dodecyl ether-capped polyethylene glycol (1600 mol. wt.) methacrylate
    1.8 g. 4-vinyl pyridine (0.017 mole)
    209 g. benzene
Catalyst level 0.008%
Conversion in 8 hours was 92.5%
Nitrogen content 0.06% nitrogen
Ratio 102:1:1.04
2.8% in 150 neutral gave viscosity at:
    100° F., 256 SSU
    210° F., 57.2 SSU
    V.I. 140.5
Average molecular weight 270,000
Asphaltene Test, 2¼ hours

Example IX

This example shows the copolymerization of dodecyl methacrylate, dodecyl ether-capped polyethylene glycol (1600 mol. wt.) methacrylate, and glycidyl methacrylate.

Charge:
    106 g. dodecyl methacrylate
    13.5 g. dodecyl ether-capped polyethylene glycol (1600 mol. wt.) methacrylate
    2.4 g. glycidyl methacrylate (0.017 mole)
    209 g. benzene
Catalyst level 0.008%
Conversion in 8 hours was 90.5%
Viscosity at:
    100° F., 246 SSU
    210° F., 57.0 SSU
    V.I. 143
Ratio 142:1:5.8
Average molecular weight 260,000
Asphaltene Test, 2 hours

Example X

This example shows the copolymerization of dodecyl methacrylate, dodecyl ether-capped polyethylene glycol (1600 mol. wt.) methacrylate and N,N-diethylaminoethyl methacrylate.

Charge:
    106 g. dodecyl methacrylate
    13.5 g. dodecyl ether-capped polyethylene glycol (1600 mol. wt.) methacrylate
    1.2 g. N,N-diethylaminoethyl methacrylate (0.0065 mole)
    210 g. benzene
Catalyst level 0.008%
Conversion in 8 hours was 93%
Nitrogen content 0.045% nitrogen
Ratio 143:1:1.23
2.8% in 150 neutral gave viscosity at:
    100° F., 255 SSU
    210° F., 56.8 SSU
    V.I. 140
Average molecular weight 250,000
Asphaltene Test, 2 hours

Example XI

This example shows copolymerization of dodecyl methacrylate with methacrylamide initiated polyethylene glycol.

Charge:
    112 g. dodecyl methacrylate (0.441 mole)
    8 g. methacrylamide initiated polyethylene glycol (equivalent weight 1100) (0.0072 mole)
    213 g. benzene
Catalyst level 0.008%
Conversion in 8 hours was 92%
Nitrogen content 0.047%
Ratio 108.5:1
2.8% in 150 neutral gave viscosity at:
    100° F., 250 SSU
    210° F., 55.3 SSU
    V.I. 136
Average molecular weight 220,000
Asphaltene Test greater than 24 hours

Example XII

This example shows copolymerization of dodecyl methacrylate, dodecyl ether-capped polyethylene glycol (1600 mol. wt.) methacrylate, and methacrylamide.

Charge:
    106 g. dodecyl methacrylate (0.418 mole)
    13.5 g. dodecyl ether-capped polyethylene glycol (1600 mol. wt.) methacrylate
    1.5 g. methacrylamide (0.0217 mole)
    209 g. benzene
Catalyst level 0.008%
Conversion in 8 hours was 86.5%
Nitrogen content 0.175% nitrogen
Ratio 110:1:3.5
2.8% in 150 neutral gave viscosity at:
    100° F., 221 SSU
    210° F., 53.6 SSU
    V.I. 141
Average molecular weight 180,000
Asphaltene Test 1 hour and 20 minutes

Example XIII

This example shows copolymerization of dodecyl methacrylate, dodecyl ether-capped polyethylene glycol (1600 mol. wt.) methacrylate, and N-vinyl carbazole.

Charge:
- 106 g. dodecyl methacrylate (0.418 mole)
- 13.5 g. dodecyl ether-capped polyethylene glycol (1600 mol. wt.) methacrylate
- 1.79 g. N-vinyl carbazole (0.009 mole)
- 209 g. benzene Catalyst level 0.006%
Conversion in 8 hours was 98%
Ratio 86:1:1.2
2.8% in 150 neutral gave viscosity at:
- 100° F., 299 SSU
- 210° F., 63.7 SSU
- V.I. 144

Average molecular weight 440,000
Asphaltene Test, greater than 2½ and less than 18 hours

Example XIV

This example shows copolymerization of dodecyl methacrylate, dodecyl ether-capped polyethylene glycol (1600 mol. wt.) methacrylate, and acrylonitrile.

Charge:
- 106 g. dodecyl methacrylate
- 13.5 g. dodecyl ether-capped polyethylene glycol (1600 mol. wt.) methacrylate
- 2.4 g. acrylonitrile (0.045 mole)
- 208 g. benzene Catalyst level 0.006%
Conversion in 8 hours was 88%
Ratio 132:1:1.6
2.8% in 150 neutral gave viscosity at:
- 100° F., 221 SSU
- 210° F., 53.5 SSU
- V.I. 140.5

Average molecular weight 180,000
Asphaltene Test, 40 minutes

Example XV

This example shows copolymerization of dodecyl methacrylate with diethylamine initiated polyethylene glycol 2000 methacrylate.

Charge:
- 114 g. dodecyl methacrylate
- 6 g. diethylamine initiated polyethylene glycol (2000) methacrylate (0.0027 mole)
- 213 g. benzene Catalyst level 0.008%
Conversion in 8 hours was 91.5%
Nitrogen content 0.08%
Ratio 61:1
2.8% in 150 neutral gave viscosity at:
- 100° F., 302 SSU
- 210° F., 61.7 SSU
- V.I. 139.5

Average molecular weight 380,000
Asphaltene Test, greater than 48 hours

Example XVI

This example shows the copolymerization of dodecyl methacrylate with allylamine-initiated polyethylene glycol (750 mol. wt.) to provide an effective dispersant.

The method of polymerization was as in the above examples. The charge was 40 g. allylamine-initiated polyethylene glycol (750 wt.), (0.025 mole), 20 g. dodecyl methacrylate (0.079 mole) and 108 g. benzene. Catalyst level was 0.015% azobisisobutylnitrile. 60 g. dodecyl methacrylate and 108 g. benzene were added over five hours. The polymerization was run for eight hours. Conversion was 82%. To the reaction mix was added 100 g. of 150 neutral mineral lubricating oil and the benzene was distilled off. Three volumes of mixed hexanes were added. The mixture was stirred at 130° F. for four hours, allowed to stand overnight, and the insolubles were separated by centrifugation to dehaze the mixture. The monomer ratio after this dehazing was 135 to 1. The Asphaltene Test showed the copolymer as having dispersing properties.

Example XVII

The copolymer of dodecyl methacrylate with polyethylene glycol (1600 mol. wt.) vinyl ether is illustrated in this example.

Into a 500 cc. three-necked flask equipped with mechanical stirrer, reflux condenser and buret was added 100 g. dodecyl methacrylate (0.395 mole), 20 g. polyethylene glycol (1600 mol. wt.) vinyl ether (0.011 mole), and 0.01% azobisisobutylnitrile. The flask was flushed with nitrogen, and polymerization was run at reflux. A benzene solution of azobisisobutylnitrile was added at 15-minute intervals to maintain catalyst level. Conversion in eight hours was 67%. Polyethylene glycol analysis indicated an alkyl to polyglycol ratio of 94 to 1. Asphaltene Test was more than 7 hours.

Example XVIII

This example illustrates the polyglycol polymers in which the polyglycol chains are attached to a preformed polyisobutylene backbone via phosphonyloxy groups.

300 cc. of an 11.6% solution of polyisobutylene (mol. wt. about 200,000) in benzene was mixed with 30 cc. phosphorus trichloride. Oxygen was blown through the solution at 10–20° C. until evolution of heat ceased. The chlorophosphonylated polymer was purified by repeated precipitation from benzene with acetone. Yield 86%. 9 g. of this product in 75 ml. benzene was refluxed 3 hours with 5 ml. pyridine and 25 g. dried, base-free dodecyl ether-capped polyethylene glycol (mol. wt. about 1800). The product thus obtained was purified by precipitation from benzene with methanol.

The dried polymer product, upon analysis, was found to contain 0.34, 0.37% phosphorus corresponding to approximately 117 isobutylene units per glycol phosphonate group. The average molecular weight was estimated as 60,000. 2.8% of the polymer in 150 neutral mineral lubricating oil had the following viscosity-temperature characteristics:

Viscosity 100° F., 219.7 SSU
Viscosity 210° F., 49.17 SSU
V.I. 114
Asphaltene Test, greater than 5 hours

Example XIX

Polyglycol macromolecules in which the polyglycol group is attached by means of a sulfonyloxy group to a polyisobutylene backbone are shown by this example.

10 g. polyisobutylene (mol. wt. about 200,000) and 0.25 g. α,α′-azobisisobutyronitrile were dissolved in 150 cc. benzene and saturated with sulphur dioxide gas at 60° C. The gas was introduced at 1 liter per minute, through a fritted disc in the bottom of the vessel. Chlorine was bubbled in through a tube above this disc at about 1.25 liter per minute for 10 minutes. The solution was flushed with dry nitrogen and was added to 25 g. dodecyl ether-capped polyethylene glycol (mol. wt. about 1800) and 5 cc. pyridine in 150 cc. chloroform. The mixture was boiled gently until the volume was reduced to 150 cc. total.

The polymer obtained above was purified by repeated precipitation with methanol. The yield of polymer was 72%. The dried polymer was analyzed and found to contain 1.43, 1.41% sulphur. The average molecular weight was 160,000. 2.8% of the polymer in 150 neutral mineral lubricating oil had the following viscosity temperature characteristics:

Viscosity 100° F., 481.3 SSU
Viscosity 210° F., 76.47 SSU
V.I. 132
Asphaltene Test, 1 hour In the foregoing description of the invention, the term "hydrocarbyl" is used with reference to the class of organic groups commonly known as "hydrocarbon groups." As employed herein, this term is considered to be a more convenient and concise generic expression for describing said hydrocarbon groups.

While the character of this invention has been described in detail with numerous examples, this has been done by way of illustration only and without limitation of the invention. It will be apparent to those skilled in the art that numerous modifications and variations of the illustrative examples may be made in the practice of the invention within the scope of the following claims.

We claim:
1. An oil-soluble polymer of (A) polymerizable oil-solubilizing compounds having a single ethylenic linkage and containing a monovalent hydrocarbon group of from 4 to 30 aliphatic carbon atoms and (B) at least one alkenyl ether of polyalkylene glycol selected from the group consisting of polyalkylene glycols having a molecular weight between about 220 and 30,000, and from 2 to 7 carbon atoms in each alkylene group and monoalkyl ethers thereof, said alkenyl group having from 3 to 20 carbon atoms, said (A) component constituting from about 40 to 96% by weight and said (B) component constituting a total of from about 4 to 60% by weight of the polymer composition, there being present at least one monomer of said (B) component and said polymer being substantially saturated and having a molecular weight of at least 50,000 as determined by standard light scattering methods and a solubility in oil of at least 0.5% by weight, said polyglycols having at least 5 alkylene oxide units each and being attached by a single amino group to said polymer.

2. A polymer according to claim 1 in which the (A) component is alkyl methacrylate wherein the alkyl group contains from 8 to 30 carbon atoms and the (B) component is vinyl monoether of polyethylene glycol.

3. A polymer according to claim 1 in which the (A) component is dodecyl methacrylate and the (B) component is vinyl monoether of polyethylene glycol.

References Cited
UNITED STATES PATENTS 3,189,586  6/1965  Stuart et al. _____ 260—85.7

JOSEPH L. SCHOFER, *Primary Examiner.*

H. WONG, JR., *Assistant Examiner.*